(12) United States Patent
Gapontsev et al.

(10) Patent No.: US 9,140,865 B1
(45) Date of Patent: Sep. 22, 2015

(54) TERMINAL BLOCK FOR HIGH POWER FIBER LASER SYSTEM

(71) Applicant: IPG PHOTONICS CORPORATION, Oxford, MA (US)

(72) Inventors: Valentin Gapontsev, Worcester, MA (US); Valentin Fomin, Burbach (DE); Dimitri Yagodkin, Burbach (DE); Alexander Makagon, Burbach (DE)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 14/308,176

(22) Filed: Jun. 18, 2014

Related U.S. Application Data

(63) Continuation of application No. PCT/US2012/070461, filed on Dec. 19, 2012.

(60) Provisional application No. 61/577,415, filed on Dec. 19, 2011.

(51) Int. Cl.
| | |
|---|---|
| *G02B 6/42* | (2006.01) |
| *G02B 6/34* | (2006.01) |
| *G02B 6/25* | (2006.01) |
| *G02B 6/12* | (2006.01) |
| *G02B 6/32* | (2006.01) |
| *G02B 6/26* | (2006.01) |
| *G02B 6/255* | (2006.01) |

(52) U.S. Cl.
CPC ............... *G02B 6/4296* (2013.01); *G02B 6/25* (2013.01); *G02B 6/34* (2013.01); *G02B 6/2552* (2013.01); *G02B 6/262* (2013.01); *G02B 6/32* (2013.01); *G02B 2006/12166* (2013.01); *G02B 2006/12192* (2013.01)

(58) Field of Classification Search
CPC .......... G02B 6/32; G02B 6/2552; G02B 6/262
USPC ..................................... 385/15, 33, 79, 88, 93
See application file for complete search history.

(56) References Cited

U.S. PATENT DOCUMENTS

| | | | | |
|---|---|---|---|---|
| 4,119,362 | A * | 10/1978 | Holzman | 385/74 |
| 4,290,667 | A * | 9/1981 | Chown | 385/33 |
| 6,408,115 | B1 | 6/2002 | McIntyre | |
| 6,744,566 | B2 * | 6/2004 | Ludington et al. | 359/717 |
| 7,200,300 | B2 * | 4/2007 | Barefoot et al. | 385/33 |
| 2002/0118715 | A1 * | 8/2002 | Kimura et al. | 372/36 |
| 2003/0012545 | A1 * | 1/2003 | Bellman et al. | 385/140 |
| 2003/0021543 | A1 * | 1/2003 | Mann et al. | 385/74 |
| 2004/0156585 | A1 * | 8/2004 | Matusick et al. | 385/33 |
| 2005/0173817 | A1 | 8/2005 | Fauver et al. | |
| 2006/0134535 | A1 * | 6/2006 | Porque | 430/30 |

* cited by examiner

*Primary Examiner* — Ryan Lepisto
*Assistant Examiner* — Guy Anderson
(74) *Attorney, Agent, or Firm* — Yuri Kateshov, Esq.; Timothy J. King, Esq.

(57) ABSTRACT

A fiber connector system provides a pigtailed monolithic terminal block of a fiber connector configured to alter a space distribution of laser output radiation. The output facet of the pigtailed monolithic terminal block is configured to alter the divergence of an output beam allowing collimation, focusing, or any desired distribution without additional optical circuitry. The fiber connector system is operative to couple two fibers from respective different fiber devices and allows positioning additional optical components there between.

5 Claims, 2 Drawing Sheets

TERMINAL BLOCK FOR HIGH POWER FIBER LASER SYSTEM

BACKGROUND OF THE INVENTION

1. Field of the Invention

The present invention relates to a pigtailed or fiber connector for a fiber laser. More particularly, the present invention provides a pigtailed structure that may be used to alter spatial distribution of output beam.

2. Description of the Related Art

Referring now to FIG. 1, typically, high power fiber lasers have one or a plurality of component known as a fiber connector, shown generally at 100. The connector 100 is operative to output radiation from a laser system. The output radiation may further propagate over the free space along a light path and either be coupled into a downstream laser component or perform the task at hand.

Connector 100 includes a ferrule 105, partially enclosing a block 102 made from quarts and having a cylindrical shape and a flat front (upstream or input) facet 106 and a flat back (downstream or output) facet 103. The upstream facet 106 is fused to a downstream facet of core 101 which is part of a fiber 101A that also has a cladding surrounding the core 101 upstream from the ferrule 105.

The flat surface of downstream facet 103 of block 102 is as disclosed in U.S. Pat. No. 5,619,602 (Sandstrom et al.) the entire content of which is incorporated herein by reference. As shown, the block facets 106, 103 have a planarity surface, defined as planar or required to be flat to operate.

The optical fiber 100A supports a beam output from the downstream core end of core 101 into the block 102. The beam tends to diverge from front facet 106 of block 102. As the beam continues to propagate along the block 102, its diameter gradually increases while its power density progressively decreases. Consequently, the power density of the beam at the downstream black's facet 103, which extends from the downstream end of the ferrule 105, is substantially lower than that at the output of core 101. The relatively low power density of the output radiation 104 allows covering of the outer face of the facet 103 with an an anti-reflection coating which prevents backreflected light, which may reach kW levels in high power laser systems, from damaging block 102.

The output radiation 104, as shown, is also divergent. Yet typically, the radiation 104 should be either collimated or focused which requires additional optical components, as well known to one of ordinary skill in the art.

ASPECTS AND SUMMARY OF THE INVENTION

In response, it is now that an improved fiber connector system is needed. The present invention therefore provides a fiber connector system having a monolithic terminal block of a fiber connector configured to alter space distribution of laser output radiation. Thus, in contrast to the prior art requiring discreet elements in addition to the body of the bloc, the present invention discloses a one-body optical system that is configured to perform the required task.

In accordance with one aspect of the invention, the output facet of a monolithic fiber block is non-planar and operates to change the spatial distribution of an output beam including collimation, focusing, or any desired distribution without additional discreet optical circuitry. The fiber connector system is operative to couple two fibers from respective different fiber devices or to deliver the output radiation to the surface to be treated without positioning additional discreet optical components downstream from the output facet of the block.

A further alternative aspect of the present invention allows for altering the divergence of the output beams by altering the form of an output facet of the monolithic block.

A further alternative aspect of the present invention allows for further altering the divergence of an output beam by manufacturing a diffraction element on an output facet of monolithic block. Such a diffraction element can be configured, for example, as a diffraction grating or a Fresnel-zone plate.

A further aspect of the present invention provides a non-planar surface that has an elliptical rotation in order to eliminate spherical aberrations according to a proposed formula:

$$z = \frac{cr^2}{1 + \sqrt{1 - (1+k)c^2 r^2}}$$

wherein z is cross-section of non-flat surface which is described by elliptical equation in rOz coordinate system having the following parameters determined as $$k = -\frac{1}{n^2}$$

$$\frac{1}{c} = R = L\frac{n-1}{n}$$

wherein:
n=refractive index of the block
L=length of the block
c=value inversely equal to the radius of aspherical surface in the vicinity of optical axis O of the block
R=radius of aspherical surface in the vicinity of the optical axis O of the block
r=radius of the block The above and other aspects, features and advantages of the present invention will become apparent from the following description read in conjunction with the accompanying drawings, in which like reference numerals designate the same elements.

SPECIFIC DESCRIPTION

Figure 1:
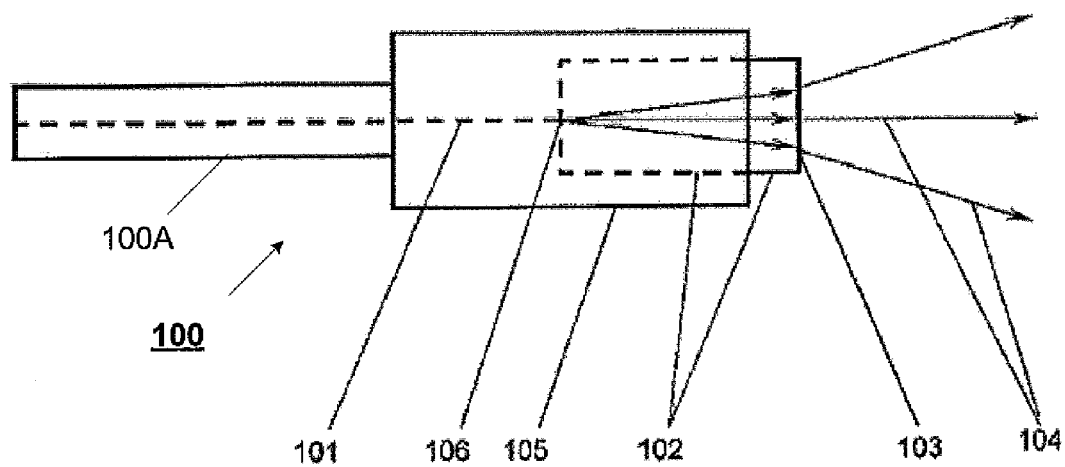
FIG. 1 illustrates a schematic of a terminal block of a fiber connector having a terminal block with a flat output facet.

Reference will now be made in detail to embodiments of the invention. Wherever possible, same or similar reference numerals are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. These and similar directional terms should not be construed to limit the scope of the invention in any manner.

Figure 2:
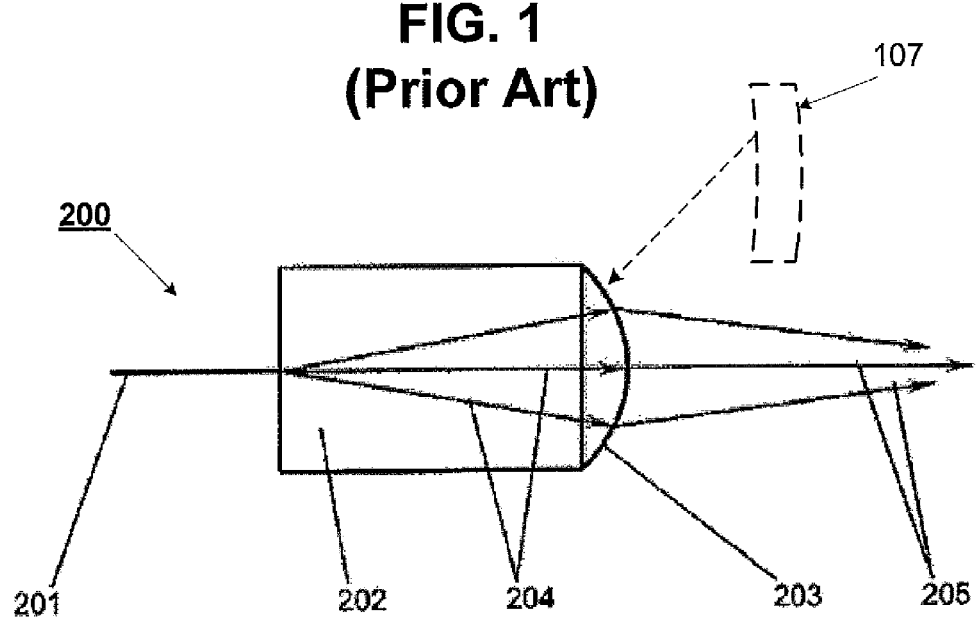
FIG. 2 is an illustration of a terminal block of a fiber connector having a terminal block with a non-planar output facet.

Referring now to FIG. 2 a fiber connector system 200 includes a monolithic pigtailed input block 202 i.e., a combination of fused non-fiber and fiber components. In particular, a downstream core end or facet of fiber 201 is fused to an input facet of block 202. A beam 204, emitted by the fiber 201, diverges as it propagates within the block 202 towards an output facet 203 of the block. The output facet 203 of block 202, originally flat, is machined to have a hemispherical, semi-spherical, aspherical, or other non-flat shape extending in three dimensions. As divergent beams 204 encounter output facet 203 the latter is operative to change their divergence into output beam 205 which can be collimated, focused, or have any predetermined and desired special distribution. As a result, this invention is operative to eliminate the need to use additional optical circuitry for collimation and focusing of the beam and thus the proposed system is labor and cost efficient.

According to a further aspect of the invention also illustrated in FIG. 2, the divergence of output beams 205 may be changed not only by altering the form (shape) of output facet 203, but also by machining flat facet 203 so that it is configured as a single piece diffraction element 207. Such a defraction element 207 can be operatively configured, for example, as a diffraction grating to split and diffract the beam in several directions as a Fresnel-zone plate operative to collimate the output beam. It will be understood from FIG. 2, that optional defraction element 207 is shown as spaced from output facet 203 for illustrative purposes only. In actual manufacturing or assembly diffraction element 207 is in fact machined in the facet I and is integral part thereof operative to modify the spatial distribution of the output beams.

Figure 3:
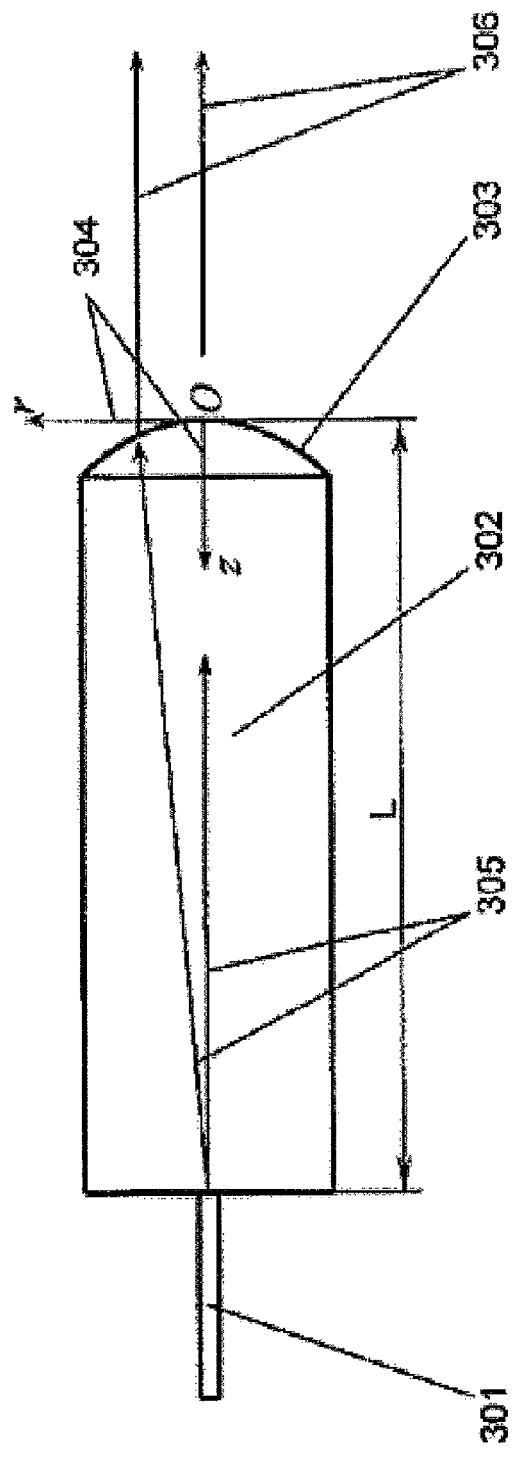
FIG. 3 is an illustration of a terminal block illustrated for supporting calculation of central cross section for collimation of an output beam.

Referring now to FIG. 3, an illustration and calculation provided for collimation of an output beam according to the present invention. As noted, an optical fiber 301 transmits a divergent output beam 305 through block 302.

An output facet 303 of block has an aspherical surface, and extends in three-dimensions (is non-planar) as discussed. A coordinate system 304 is provided thereon. As illustrated, block 302 provides an optical axis O along a length and the calculation below allows for an aspherical surface having an elliptical rotation in order to eliminate all spherical aberrations and result in a collimated output beam 306 with an altered distribution of laser output radiation. As below, the calculation shows that the central cross section z of aspherical surface 303 can be described by the following equation:

$$z = \frac{cr^2}{1 + \sqrt{1 - (1+k)c^2r^2}}$$

wherein:

$$k = -\frac{1}{n^2}$$

$$\frac{1}{c} = R = L\frac{n-1}{n}$$

and:
n=refractive index of the block
L=length of the block
c=value inversely equal to the radius of aspherical surface in the vicinity of optical axis O of the block R=radius of aspherical surface in the vicinity of the optical axis O of the block
r=radius of the block.

Figure 4:
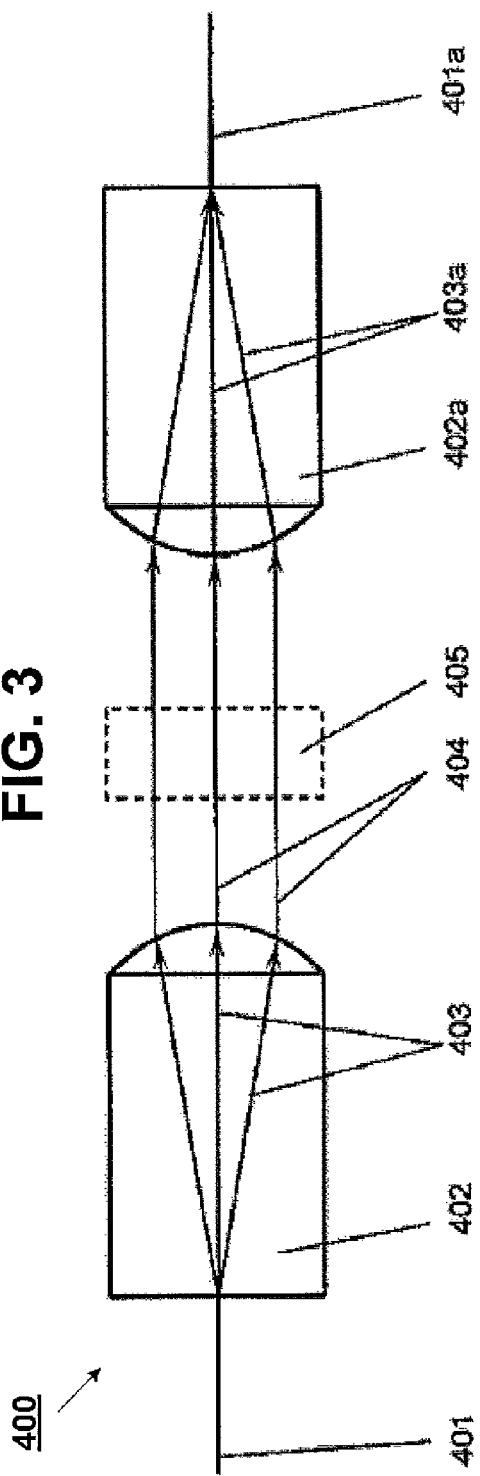
FIG. 4 is an illustration of two terminal blocks in respective connectors (not shown) for coupling two fibers.

Referring additionally now to FIG. 4, a use of the proposed invention is provided for coupling two fibers shown generally as a fiber connector system 400. It is now recognized that the structure of the connectors noted above can be used for coupling two (or more) fibers from respective different fiber devices or systems (devices not shown). Such a structure allows one or more additional optical components to be positioned between the two connectors.

In a non-limiting example, these one or more optical components are represented as optical element 405 which may not be used at all, or if utilized, would likely alter the divergence of respective beams. For a non-limiting example, optical element 405 may be a protective lens, a non-reflective coating on a lens, one or more defraction elements, or other optical elements known to those, of skill in the art. It will be further noted, that non-reflective coatings may be applied directly to output facets of the proposed blocks without departing from the scope and spirit of the present invention.

As noted, an input optical fiber 401 provides divergent output beams 403 in passing through a terminal block 402. The output facet (shown but not numbered) of block 402 alters the spatial distribution of output beams 403 transforming the output beams 403 into, for example, collimated beam 404 (as shown).

Further, one or more optional additional optical elements, shown signally at element 405 (discussed above) may receive beams 404 and transmit the same to the non-planar receiving facet (shown but not numbered) of an output terminal block 402a which transforms beam 404 to a beam 403a in such a way that the beam is operatively focused in order to enter an output fiber 401a for further transmission.

As a result of the above disclosure, it will be recognized that the proposed invention can greatly simply the structure required for operative coupling of two optical fibers from respective different optical devices.

It will be further recognized that by selecting different blocks 402, 402a, or with different respective output and receiving facets, or by employing optionally an additional optical element 405, that a wide variety of fiber connector configurations may be used. Note the different blocks may not be positioned in a coaxial manner. For example, the blocks may be spaced diagonally from one another.

It will be further recognized that by selecting an adaptive additional optical element 405, the collimated beams 404 from input block 402 may be distributed to more than one blocks 403a (for example to output blocks 403a', 403a'', 403a''', all not shown).

It will be recognized that the proposed fiber connector systems can be used for high power and ultra-high-power fiber laser radiation transmission without causing damage to the input or output fibers, fiber blocks, or respective facets.

It will be understood that that the phrases flat, plan, planar or planarity depict a surface that extends in two dimensions but absolutely not in a third-dimension. Whereas the phases spherical, aspherical, hemispherical, semi-spherical, cylindrical, aplanar, non-planar, or other non-flat meaning phrases will be understood to depict a surface that extends in three-dimensions.

It will be recognized that the phrases terminal block and block may be interchangeably used within the scope of the present invention to depict a connector for receiving and transmitting there through a radiation. It will also be understood that the phrases 'facet' maybe understood as lace' or the outer surface of a block for input and output purposes, without departing from the scope and spirit of the present invention.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A fiber connector system, configured to alter a space distribution of a laser radiation passing there through, the fiber connector system comprising:
   an input optical fiber configured to transmit an input of the laser radiation along a light path; and
   at least one monolithic block having an input facet fused to the fiber which provides the received laser radiation with a first divergence distribution relative to a first optical axis of the one terminal block as the laser radiation propagates along the block, the one monolithic terminal block having an output facet configured with an aspherical surface to spatially shape the laser radiation having the first divergence distribution, the aspherical surface being configured as a diffraction grating element or a Fresnel-zone plate and having an elliptical rotation which is effective to eliminate spherical aberrations relative to the optical axis,
a central cross section of the aspherical surface being described by equation (I)

$$z = \frac{cr^2}{1 + \sqrt{1 - (1+k)c^2 r^2}} \quad (I)$$

wherein:

$$k = -\frac{1}{n^2}$$

$$\frac{1}{c} = R = L\frac{n-1}{n}$$

n—refractive index of the terminal block, L=length of the terminal block, c=value inversely equal to the radius of the aspherical surface in the vicinity of the optical axis of the terminal block, and R=radius of aspherical surface in the vicinity of the optical axis of the terminal block.

2. The fiber connector system, according to claim 1, further comprising:
   a second monolithic block positioned along the optical axis of the first terminal block and configured to receive the shaped laser radiation and operative to alter the received shaped laser radiation relative to the optical axis, the second monolithic terminal block being configured with:
      an input facet receiving the shaped laser radiation and configured to converge the received shaped laser radiation from the first monolithic terminal block,
      a planar output facet on the second terminal block opposite the input facet; and
   an output optical fiber fused to the planar output facet,
   the input facet being configured to focus the received shaped laser radiation so as to enter the output optical fiber coupled into the planar output facet, whereby the laser radiation is coupled from the first input fiber to the output optical fiber.

3. The fiber connector system of claim 2 further comprising an intermediate optical element spaced between one and second monolithic blocks and configured to not alter the shaped laser radiation.

4. The fiber connector system of claim 2, wherein the one and second terminal blocks have respective optical axes extending parallel to one another so that the axes are either aligned or misaligned.

5. The fiber connector system, according to claim 2, wherein the non-planar upstream facet of the second terminal block is an aspherical surface having an elliptical rotation effective to eliminate spherical aberrations relative to the optical axis and having the central cross section of the one aspherical surface which is described by the equation (I).

* * * * *